US012802418B2

(12) United States Patent
Zhang et al.

(10) Patent No.: US 12,802,418 B2
(45) Date of Patent: Nov. 17, 2026

(54) WEAR STATE ONLINE MONITORING METHOD AND SYSTEM BASED ON TRANSFER LEARNING AND MULTI-SOURCE INFORMATION FUSION

(71) Applicant: Shanghai Jiao Tong University, Shanghai (CN)

(72) Inventors: Zhinan Zhang, Shanghai (CN); Zhen Li, Shanghai (CN); Songkai Liu, Shanghai (CN); Nian Yin, Shanghai (CN); Ke He, Shanghai (CN); Huihui Zhou, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 251 days.

(21) Appl. No.: 18/756,053

(22) Filed: Jun. 27, 2024

(65) Prior Publication Data

US 2025/0046067 A1 Feb. 6, 2025

(30) Foreign Application Priority Data

Aug. 2, 2023 (CN) ......................... 202310961094.8

(51) Int. Cl.

*G06V 10/778* (2022.01)
*G06V 10/26* (2022.01)
*G06V 10/44* (2022.01)

(52) U.S. Cl.

CPC ............ *G06V 10/778* (2022.01); *G06V 10/26* (2022.01); *G06V 10/44* (2022.01)

(58) Field of Classification Search

CPC ...... G06V 10/778; G06V 10/26; G06V 10/44; G06V 2201/06; G06V 10/28; G06V 10/30;

(Continued)

(56) References Cited

U.S. PATENT DOCUMENTS 5,638,129 A * 6/1997 Lee ........................ H04N 19/54 375/E7.11
9,864,932 B2 * 1/2018 Wu ...................... G06V 10/772

(Continued)

FOREIGN PATENT DOCUMENTS

CN 102980765 B 3/2014
CN 111230159 B 4/2021

(Continued)

OTHER PUBLICATIONS

Liu Xuekun, "The Research of Marine Diesel Engine Fault Diagnosis Based on SVM and Oil Monitoring, A Thesis Submitted to Dalian Maritime University in Partial Fulfillment of the Requirements For the Degree of Master of Engineering", 88 pages, 2013.

(Continued)

*Primary Examiner* — Santiago Garcia
(74) *Attorney, Agent, or Firm* — Blueshift IP; Robert Plotkin

(57) ABSTRACT

A wear state online monitoring method and system based on transfer learning and multi-source information fusion are provided. The method includes: separately collecting data of a friction pair to be monitored in a friction and wear testing state and in an on-ship state; performing feature extraction on the data of the friction pair to be monitored; based on the extracted features, performing feature transferring through transfer learning to obtain successfully transferred features; training a random forest model by using the successfully transferred features, and performing wear state monitoring by using the trained random forest model. The application achieves online monitoring of the wear states of the shafting, gearbox, and wear-prone components in marine and aerospace power plants. The incorporation of transfer learning and multi-source information fusion reduces the quality requirements of the collected signals and enhances the (Continued)

robustness of wear state monitoring, thereby broadening the application scope of the system.

9 Claims, 8 Drawing Sheets

(58) Field of Classification Search
CPC ......... Y02T 90/00; G06F 18/20; G06F 18/15; G06F 18/213; G06F 18/214; G06F 18/217; G06F 2218/02; G06F 2218/08; G06F 2218/12
See application file for complete search history.

(56) References Cited

U.S. PATENT DOCUMENTS

| | | | | |
|---|---|---|---|---|
| 10,289,909 | B2 * | 5/2019 | Baradel | G06F 18/217 |
| 12,117,365 | B1 * | 10/2024 | Zhao | G01M 13/04 |
| 12,513,168 | B2 * | 12/2025 | Feng | H04L 63/1425 |
| 2005/0105830 | A1 * | 5/2005 | Chung | G06T 3/403 382/300 |
| 2009/0090592 | A1 * | 4/2009 | Mordukhovich | F16D 25/0638 701/68 |
| 2013/0071629 | A1 * | 3/2013 | Sinha | C10M 107/32 427/256 |
| 2014/0222350 | A1 * | 8/2014 | Zheng | A61B 5/316 702/19 |
| 2014/0233980 | A1 * | 8/2014 | Liu | G03G 21/0058 399/100 |
| 2015/0233998 | A1 * | 8/2015 | Chen | G06F 3/041 324/764.01 |
| 2019/0197357 | A1 * | 6/2019 | Anderson | G06F 16/901 |
| 2021/0075933 | A1 * | 3/2021 | Morikawa | H04N 1/00748 |
| 2022/0262104 | A1 * | 8/2022 | Salman | G06F 18/2155 |
| 2022/0303292 | A1 * | 9/2022 | Feng | H04L 63/1425 |
| 2022/0384048 | A1 * | 12/2022 | Gopalakrishnan | G16H 50/20 |
| 2022/0384055 | A1 * | 12/2022 | Gopalakrishnan | G06N 20/00 |
| 2024/0013380 | A1 * | 1/2024 | Yang | G06T 7/0012 |
| 2024/0070474 | A1 * | 2/2024 | Sagalovsky | G06N 5/01 |
| 2024/0202907 | A1 * | 6/2024 | Manikani | G06T 3/4053 |
| 2024/0241954 | A1 * | 7/2024 | Wang | G06F 21/562 |
| 2024/0257202 | A1 * | 8/2024 | Sun | G06Q 30/0201 |
| 2024/0354690 | A1 * | 10/2024 | Mills | G06Q 10/08 |
| 2024/0386166 | A1 * | 11/2024 | Zhao | G06F 30/17 |
| 2025/0039698 | A1 * | 1/2025 | Wu | H04W 24/02 |
| 2025/0165682 | A1 * | 5/2025 | Wang | G06F 30/27 |

FOREIGN PATENT DOCUMENTS

| | | |
|---|---|---|
| CN | 113418126 A | 9/2021 |
| CN | 110728667 B | 5/2023 |

OTHER PUBLICATIONS

Weifeng et al., "Research on Common Faults and Condition Monitoring and Diagnosis Technology of Marine Machinery", pp. 32-34, 2018.

* cited by examiner

Features with strong wear correlation: kurtosis of force signal under time domain Features with strong wear correlation: peak factor of acoustic signal under frequency domain Features with poor wear correlation: margin factor of force signal under frequency domain Features with strong wear correlation: AE median of acoustic signal under time domain Mutual redundancy features: peak factor of acoustic signal under time domain Mutual redundancy features: pulse factor of acoustic signal under time domain

WEAR STATE ONLINE MONITORING METHOD AND SYSTEM BASED ON TRANSFER LEARNING AND MULTI-SOURCE INFORMATION FUSION

CROSS REFERENCE TO RELATED APPLICATION

This patent application claims the benefit and priority of Chinese Patent Application No. 202310961094.8, filed with the China National Intellectual Property Administration on Aug. 2, 2023, the disclosure of which is incorporated by reference herein in its entirety as part of the present application.

TECHNICAL FIELD

The present disclosure relates to the technical field of research on friction and wear testing, and in particular, to a wear state online monitoring method and system based on transfer learning and multi-source information fusion.

BACKGROUND

Wear state detection methods mainly include direct measurement methods and indirect prediction methods. Direct measurement methods include the radioactive element method, resistance measurement method, microscope measurement method, and machine vision method. Indirect prediction methods involve collecting signals during the machining process using sensors and then inferring the wear state of friction pairs based on signal features. This includes the prediction method based on physical models and the data-driven prediction method. Currently, the mainstream methods are the machine vision method and the data-driven prediction method. The machine vision method has high accuracy, but due to the high-speed operations of the friction pair, the limited operation space, and the harsh environment, it is difficult for the camera to capture clear images with defined edges. In some cases, the camera cannot be positioned at a suitable angle to capture the friction pair at all. Therefore, the machine vision method is often used for research under laboratory conditions. The data-driven prediction method does not directly measure the wear amount, and the accuracy is weaker, but multi-source signal data is easy to obtain and sensors are easy to arrange, making it suitable for real-time wear state monitoring in production.

For example, ships play an important role in waterway transportation, ocean development, and national defense. The power system is the “heart” of the ship, and the safety and reliability of the power system directly affect the safe navigation of the ship. The failure rate of marine power systems is shown in Table 1 (Li Weifeng, Wang Lei. Research on Common Faults and Condition Monitoring and Diagnosis Technology of Marine Machinery [J]. Automation and Instrumentation, 2018, No. 224(06): 32-34). Common causes of power plant failures include excessive wear and tear, wind erosion, machine deformation, corrosion, short circuit, oil penetration, misplaced or loosened components, and poor fuel quality. Among these, wear-related failures have the highest occurrence, constituting approximately 37.5% (Liu Xuekun. Study of Fault Diagnosis of Marine Diesel Engines Based on Support Vector Machines and Oil Detection [D]. Dalian Maritime University, 2013). Therefore, it is necessary to implement online monitoring of the wear state. In addition to marine power systems, online wear state detection technology can also be applied to aerospace equipment, construction machinery, and other large power machinery. This provides effective technical solutions for the modern management of transportation and energy equipment, with evident market competitiveness and promising prospects for promotion.

TABLE 1

Failure rate of marine power systems

| Component name | Failure rate |
|---|---|
| Diesel engine | 85% |
| Shafting | 9.3% |
| Piston, cylinder liner, valve, etc. | 45.7% |
| Fuel injection system | 19.1% |

Patent CN102980765B (Application No. 20121053243.8) discloses a comprehensive test platform for marine shafting, to study the lubrication characteristics of a stern shaft of the marine propulsion shafting under the influence of infinitely variable propeller excitation forces. The platform is capable of measuring external loads, bearing support forces, shaft power, shafting vibrations, and lubrication state data of the stern shaft bearing. However, the patent neither clearly specifies the composition of the monitoring control unit nor addresses the processing of monitoring data. To address the issues of wear state online monitoring, the method and system provided in the present disclosure can be integrated into experimental platforms, power plants of ships and other machinery, thereby enhancing the technical implementation details further.

Patent CN111230159B (Application No. 202010135443.7) discloses a multi-sensor fusion method and system for lathe tool state monitoring, including collecting acoustic emission signals and current signals during the lathe tool's operation to monitor the wear state, but the wear state determining method is to compare a signal value with a threshold $xth_r$ or iur, which underutilizes the signal data. The present disclosure proposes extracting 12 data features including the maximum value, minimum value, mean value, median value, standard deviation, root mean square, skewness, kurtosis, waveform factor, peak factor, pulse factor and margin factor, of the force/torque signals, acoustic emission signals, vibration signals and so on. Pearson correlation analysis is then employed for preliminary feature selection, followed by feature transfer, to calculate the maximum mean difference between corresponding features for feature re-selection. This approach ensures better utilization of signal data.

Patent CN110728667B (Application No. 201910951668.7) discloses an automatic and accurate method for measuring tool wear amount based on gray image probabilities. The method includes establishing a likelihood function for the tool wear boundary and a prior probability model for the original boundary, and reconstructing the missing original boundary by maximizing the posterior probability of the tool's original boundary. However, the reconstructed boundary lacks edge inpainting. The presence of breakpoints and outliers in the edges hinders subsequent wear determination for image processing. The present disclosure proposes the use of the Canny algorithm to extract edges. During the scanning process, a quasi-edge point to the right of each current pixel is triangulated with a certain slope to identify the nearest quasi-edge point, and the current pixel is then connected to the nearest quasi-edge point to facilitate edge inpainting.

Patent CN113418126A (Application No. 202110832726.1) discloses a novel wear monitoring method for transmission lubrication systems of military aero-engines. The method achieves rapid fault detection and diagnosis by leveraging specialized identification of abrasive particle images. However, the focus of image detection lies in distinguishing the morphology of abrasive particles in lubricating oil, which differs from the analysis method and relevant features of surface wear morphology of friction pairs under dry friction conditions according to the present disclosure. In the present disclosure, the wear region is identified as a pit region between the initial edge and the upper edge, and a coating shedding region between the upper and lower edges. The wear features include the wear area and the wear width obtained through weighted calculation.

SUMMARY

To resolve the deficiencies in the prior art, the present disclosure provides a wear state online monitoring method and system based on transfer learning and multi-source information fusion.

The wear state online monitoring method based on transfer learning and multi-source information fusion according to the present disclosure includes the following steps:

- step S1: separately collecting data of a friction pair to be monitored in a friction and wear testing state and in an on-ship state, where the data includes in-situ images of the friction pair and multi-source tribological signals;
- step S2: separately preprocessing the collected in-situ images of the friction pair and multi-source tribological signals, and extracting multi-source signal features and visual wear features based on preprocessed multi-source tribological signals and in-situ images of the friction pair;
- step S3: using the multi-source signal features and the visual wear features extracted in the friction and wear testing state as source domain features, and using the multi-source signal features and the visual wear features extracted in the on-ship state as target domain features;
- step S4: separately preprocessing the source domain features and the target domain features to obtain preprocessed source domain features and target domain features;
- step S5: performing feature transferring on the preprocessed source domain features and target domain features by using a feature transfer model, to obtain transfer features;
- step S6: performing inverse normalization on the transfer features to obtain all data of the transfer features;
- step S7: performing feature screening based on all the data of the transfer features, to obtain successfully transferred features; and
- step S8: training a random forest model by using the successfully transferred features to obtain a trained random forest model, and performing wear state monitoring using the trained random forest model.

Preferably, the multi-source tribological signals may include a force/torque signal, an acoustic emission signal, and a vibration signal;

- the force/torque signal may be derived from current data during an operation process of a power source or from data of a force/torque sensor installed on the friction pair or being capable of measuring the friction pair through a transmission mechanism;
- the acoustic emission signal may include an acoustic pressure signal collected by an acoustic pressure sensor and an acoustic signal collected by a digital microphone; and
- the vibration signal may include a near-end signal collected by a vibration sensor fixedly installed near the friction pair and a far-end signal collected by a vibration sensor installed far away from the friction pair.

Preferably, the step S2 may include:

- step S2.1: performing signal filtering and signal cutting on the multi-source tribological signals, to obtain processed multi-source tribological signals;
- step S2.2: performing time domain analysis and frequency domain analysis on the processed multi-source tribological signals;
- step S2.3: performing image cropping, image graying, image noise reduction, and filtering on the in-situ images of the friction pair, to obtain processed in-situ images of the friction pair;
- step S2.4: extracting edges of the friction pair by using a Canny algorithm based on the processed in-situ images of the friction pair;
- step S2.5: performing edge inpainting based on the extracted edges of the friction pair, to identify a wear region; and
- step S2.6: based on the identified wear region, separately performing feature extraction on a maximum wear width, an average wear width, and a wear area of a primary friction surface and a secondary friction surface of the friction pair.

Preferably, the step S2.2 may include: performing time domain analysis and frequency domain analysis based on preprocessed force/torque signal, vibration signal, acoustic pressure signal, and acoustic signal, and extracting a maximum value, a minimum value, a mean value, a median, a standard deviation, a root mean square, a skewness, kurtosis, a waveform factor, a peak factor, a pulse factor, and a margin factor.

$$x_{skew} = \frac{1}{N}\frac{\Sigma(x_i - \overline{x})^3}{x_{std}^3}$$

$$x_{kurt} = \frac{1}{N}\frac{\Sigma(x_i - \overline{x})^4}{x_{std}^4}$$

$$x_w = \frac{x_{rms}}{\frac{1}{N}\Sigma|x_i|}$$

$$x_{pe} = \frac{\max|x_i|}{x_{rms}}$$

$$x_{pu} = \frac{\max|x_i|}{\frac{1}{N}\Sigma|x_i|}$$

$$x_m = \frac{\max|x_i|}{\left(\frac{1}{N}\Sigma\sqrt{|x_i|}\right)^2}$$

$x_{skew}$ represents the skewness, N represents the number of $x_i$, $x_i$ represents an $i^{th}$ data point, $\overline{x}$ represents the mean value, $x_{std}$ represents the standard deviation, $x_{kurt}$ represents the kurtosis, $x_w$ represents the waveform factor, $x_{rms}$ represents the root mean square, $x_{pe}$ represents the peak factor, $x_{pu}$ represents the pulse factor, and $x_m$ represents the margin factor.

Preferably, the step S2.5 may include: scanning quasi-edges from left to right, using quasi-edge pixels in a first column as confirmed edge points by default; in the scanning process, performing triangle search at a specific slope on quasi-edge points to the right of each current pixel, and searching for a nearest quasi-edge point, connecting the current pixel and the nearest quasi-edge point for edge inpainting, then using the nearest edge point as the current edge point, and repeating the search and inpainting process on quasi-edge points to the right of the nearest edge point; and discarding an edge point located beyond a search region.

Preferably, the step S4 may include:

step S4.1: smoothing each feature-time curve with a Savitzky-Golay filter to complete post-processing of the feature-time curve, setting a polynomial degree to 1 to ensure local monotonicity of the feature-time curve, and setting a window size to t data points to balance smoothing effect of the Savitzky-Golay filter and local trend retention of the feature-time curve; performing data augmentation on filtered data using an interpolation method; and performing preliminary feature selection using Pearson correlation analysis, to reduce a total number of the source domain features and the target domain features; and step S4.2: separately performing normalization on the source domain features and the target domain features to obtain 0-1 distribution of the source domain features and 0-1 distribution of the target domain features.

Preferably, the feature transfer model may adopt:

$$X_{tr,i} = f_{t,i}^{-1}\left(a_i^T f_{s,i}(X_{s,i}) + b_i\right)$$

$f_{t,i}$ represents a normalization function of the target domain features, $f_{s,i}$ represents a normalization function of the source domain features, $a_i$ and $b_i$ represent transfer parameters of the features, T represents transposition, $X_{s,i}$ represents the source domain feature, and $X_{tr,i}$ represents the target domain feature.

Preferably, the step S6 may include: performing inverse normalization on the transfer features with the normalization function of the target domain features, to obtain all the data of the transfer features.

Preferably, the step S7 may include: performing feature screening by using a maximum mean discrepancy (MMD) loss function based on all the data of the transfer features, to obtain the successfully transferred features.

The MD loss function may adopt:

$$MMD(X_{tr,i}, X_{t,i}) = \left\| \frac{1}{n_{tr}} \sum_{j_{tr}=1}^{n_{tr}} \phi(X_{tr,ij}) - \frac{1}{n_t} \sum_{j_t=1}^{n_t} \phi(X_{t,ij_s}) \right\|_H^2$$

$X_{tr,i}$ represents the transfer feature, $X_{t,i}$ represents the target feature, $\phi$ represents a kernel function, $X_{tr,ij}$ represents an individual data point of the transfer feature, and $X_{t,ij_s}$ represents an individual data point of the target feature.

A wear state online monitoring system based on transfer learning and multi-source information fusion according to the present disclosure includes:

a module M1 configured to: separately collect data of a friction pair to be monitored in a friction and wear testing state and in an on-ship state, where the data includes in-situ images of the friction pair and multi-source tribological signals;

a module M2 configured to: separately preprocess the collected in-situ images of the friction pair and multi-source tribological signals, and extract multi-source signal features and visual wear features based on preprocessed multi-source tribological signals and in-situ images of the friction pair;

a module M3 configured to: use the multi-source signal features and the visual wear features extracted in the friction and wear testing state as source domain features, and use the multi-source signal features and the visual wear features extracted in the on-ship state as target domain features;

a module M4 configured to: separately preprocess the source domain features and the target domain features to obtain preprocessed source domain features and target domain features;

a module M5 configured to: perform feature transferring on the preprocessed source domain features and target domain features by using a feature transfer model, to obtain transfer features;

a module M6 configured to: perform inverse normalization on the transfer features to obtain all data of the transfer features;

a module M7 configured to: perform feature screening based on all the data of the transfer features, to obtain successfully transferred features; and a module M8 configured to: train a random forest model by using the successfully transferred features to obtain a trained random forest model, and perform wear state monitoring by using the trained random forest model.

Compared with the prior art, the present disclosure has the following beneficial effects:

1. The present disclosure effectively tackles the challenge of wear state online monitoring of friction pairs. The system is compact, non-destructive to friction pairs, easy to set up, and suitable for monitoring the wear state of key components in marine power systems.
2. A method for collecting in-situ images of friction pairs for machine vision processing is proposed to optimize the manual offline microscope measurement method commonly used for wear amount measurement at present. The current method requires repeated disassembly, which introduces installation errors and wastes time. The machine vision method proposed in the present disclosure adopts in-situ detection, thereby improving model construction efficiency while ensuring accuracy.
3. Due to the varying complexity of friction systems, the wear amount growth curves of friction pairs differ under different working conditions. Therefore, a model trained under one condition cannot be directly applied to another working condition, and laboratory research results may not fully align with real wear situations during actual application. To address this, the present disclosure provides a wear prediction method based on feature transfer. The feature transfer method adopted in the present disclosure constructs a wear prediction model with higher accuracy even when data from the new working condition is limited.

BRIEF DESCRIPTION OF THE DRAWINGS

Other features, objectives, and advantages of the present disclosure will become more apparent by reading the detailed description of non-limiting embodiments with reference to the following accompanying drawings.

DETAILED DESCRIPTION OF THE EMBODIMENTS

Figure 1:
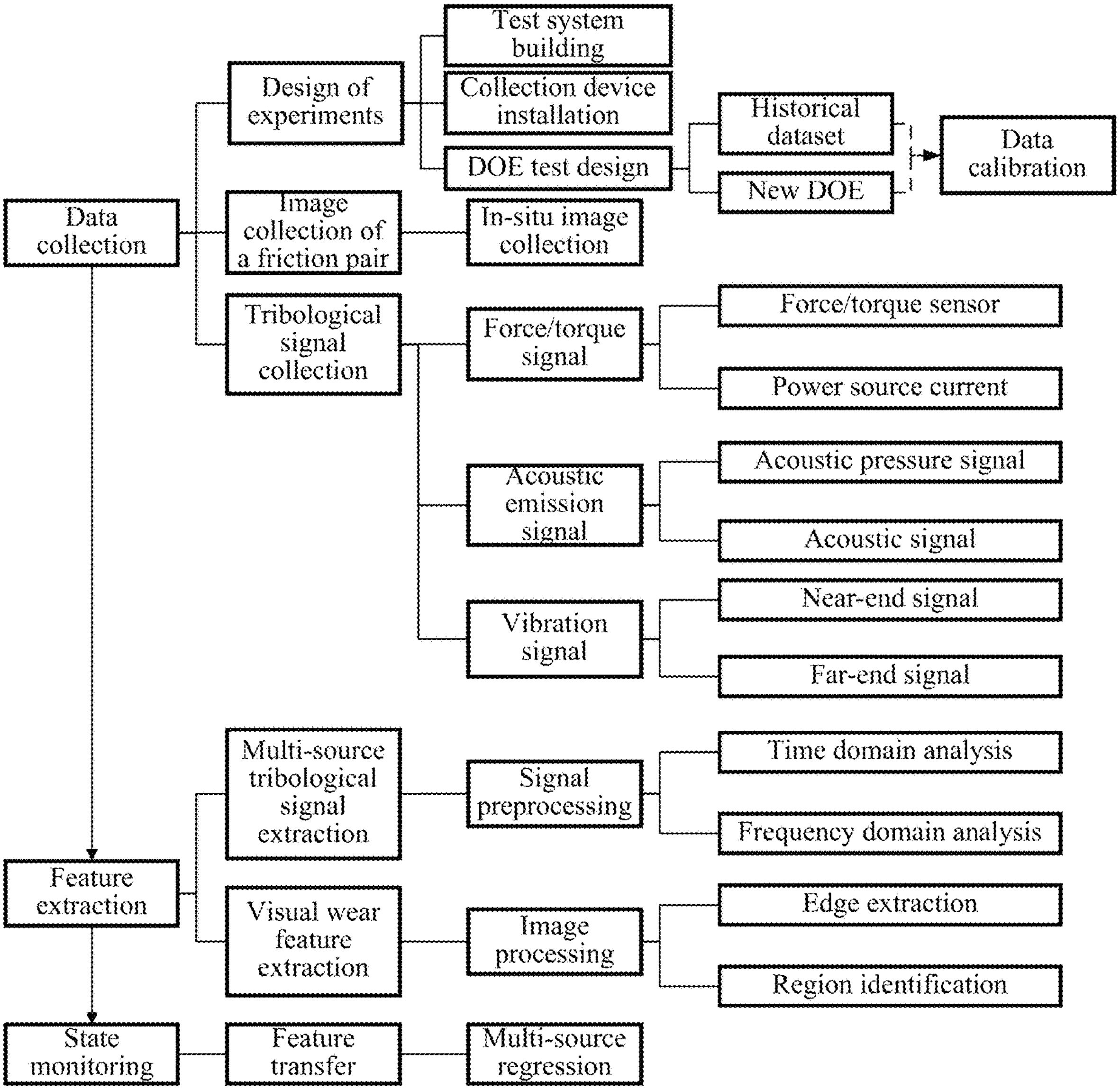
FIG. 1 is a schematic diagram of a wear state online monitoring method based on transfer learning and multi-source information fusion.

The present disclosure is described in detail below with reference to specific examples. The following examples will help those skilled in the art to further understand the present disclosure, but do not limit the present disclosure in any way. It should be noted that several variations and improvements can also be made by a person of ordinary skill in the art without departing from the conception of the present disclosure. These all fall within the protection scope of the present disclosure.

Embodiment 1

The wear state online monitoring method based on transfer learning and multi-source information fusion according to the present disclosure includes the following steps:

In step S1, data of a friction pair to be monitored is separately collected in a friction and wear testing state and in an on-ship state, and the data includes in-situ images of the friction pair and multi-source tribological signals.

In step S2, the collected in-situ images of the friction pair and multi-source tribological signals are separately preprocessed, and multi-source signal features and visual wear features are extracted based on preprocessed multi-source tribological signals and in-situ images of the friction pair.

In step S3, the multi-source signal features and the visual wear features extracted in the friction and wear testing state are used as source domain features, and the multi-source signal features and the visual wear features extracted in the on-ship state are used as target domain features.

In step S4, the source domain features and the target domain features are separately preprocessed to obtain preprocessed source domain features and target domain features.

In step S5, feature transferring is performed on the preprocessed source domain features and target domain features by using a feature transfer model, to obtain transfer features.

In step S6, inverse normalization is performed on the transfer features to obtain all data of the transfer features.

In step S7, feature screening is performed based on all the data of the transfer features, to obtain successfully transferred features.

In step S8, a random forest model is trained by using the successfully transferred features to obtain a trained random forest model, and wear state monitoring is performed by using the trained random forest model.

Specifically, the multi-source tribological signals may include a force/torque signal, an acoustic emission signal, and a vibration signal.

The force/torque signal may be derived from current data during an operation process of a power source or from data of a force/torque sensor installed on the friction pair or being capable of measuring the friction pair through a transmission mechanism.

The acoustic emission signal may include an acoustic pressure signal collected by an acoustic pressure sensor and an acoustic signal collected by a digital microphone.

The vibration signal may include a near-end signal collected by a vibration sensor fixedly installed near the friction pair and a far-end signal collected by a vibration sensor installed far away from the friction pair.

Specifically, the step S2 may include the following steps:

In step S2.1, signal filtering and signal cutting are performed on the multi-source tribological signals, to obtain processed multi-source tribological signals.

In step S2.2, time domain analysis and frequency domain analysis are performed on the processed multi-source tribological signals.

In step S2.3, image cropping, image graying, image noise reduction, and filtering are performed on the in-situ images of the friction pair, to obtain processed in-situ images of the friction pair.

In step S2.4, edges of the friction pair are extracted by using a Canny algorithm based on the processed in-situ images of the friction pair.

In step S2.5, edge inpainting is performed based on the extracted edges of the friction pair, to identify a wear region.

In step S2.6, based on the identified wear region, feature extraction is separately performed on a maximum wear width, an average wear width, and a wear area of a primary friction surface and a secondary friction surface of the friction pair.

Specifically, the step S2.2 may include: performing time domain analysis and frequency domain analysis based on preprocessed force/torque signal, vibration signal, acoustic pressure signal, and acoustic signal, and extracting a maximum value, a minimum value, a mean value, a median, a standard deviation, a root mean square, a skewness, kurtosis, a waveform factor, a peak factor, a pulse factor, and a margin factor.

$$x_{skew} = \frac{1}{N}\frac{\Sigma(x_i - \overline{x})^3}{x_{std}^3}$$

$$x_{kurt} = \frac{1}{N}\frac{\Sigma(x_i - \overline{x})^4}{x_{std}^4}$$

$$x_w = \frac{x_{rms}}{\frac{1}{N}\Sigma|x_i|}$$

$$x_{pe} = \frac{\max|x_i|}{x_{rms}}$$

$$x_{pu} = \frac{\max|x_i|}{\frac{1}{N}\Sigma|x_i|}$$

$$x_m = \frac{\max|x_i|}{\left(\frac{1}{N}\Sigma\sqrt{|x_i|}\right)^2}$$

$x_{skew}$ represents the skewness, N represents the number of $x_i$, $x_i$ represents an $i^{th}$ data point, $\overline{x}$ represents the mean value, $x_{std}$ represents the standard deviation, $x_{kurt}$ represents the kurtosis, $x_w$ represents the waveform factor, $x_{rms}$ represents the root mean square, $x_{pe}$ represents the peak factor, $x_{pu}$ represents the pulse factor, and $x_m$ represents the margin factor.

Preferably, the step S2.5 may include: scanning quasi-edges from left to right, using quasi-edge pixels in a first column as confirmed edge points by default; in the scanning process, performing triangle search at a specific slope on quasi-edge points to the right of each current pixel, and searching for a nearest quasi-edge point, connecting the current pixel and the nearest quasi-edge point for edge inpainting, then using the nearest edge point as the current edge point, and repeating the search and repair process on quasi-edge points to the right of the nearest edge point; and discarding an edge point located beyond a search region.

Specifically, the step S4 may include the following steps:

In step S4.1, each feature-time curve is smoothed with a Savitzky-Golay filter to complete post-processing of the feature-time curve, a polynomial degree is set to 1 to ensure local monotonicity of the feature-time curve, and a window size is set to t data points to balance smoothing effect of the Savitzky-Golay filter and local trend retention of the feature-time curve; data augmentation is performed on filtered data using an interpolation method; and preliminary feature selection is performed using Pearson correlation analysis, to reduce a total number of the source domain features and the target domain features.

In step S4.2, normalization is separately performed on the source domain features and the target domain features to obtain 0-1 distribution of the source domain features and 0-1 distribution of the target domain features.

Specifically, the feature transfer model may adopt:

$$X_{tr,i} = f_{t,i}^{-1}\left(a_i^T f_{s,i}(X_{s,i}) + b_i\right)$$

$f_{t,i}$ represents a normalization function of the target domain features, $f_{s,i}$ represents a normalization function of the source domain features, $a_i$ and $b_i$ represent transfer parameters of the features, T represents transposition, $X_{s,i}$ represents the source domain feature, and $X_{tr,i}$ represents the target domain feature.

Specifically, the step S6 may include: performing inverse normalization on the transfer features with the normalization function of the target domain features, to obtain all the data of the transfer features.

Specifically, the step S7 may include: performing feature screening by using a maximum mean discrepancy (MMD) loss function based on all the data of the transfer features, to obtain the successfully transferred features.

The MMD loss function may adopt:

$$MMD(X_{tr,i}, X_{t,i}) = \left\| \frac{1}{n_{tr}} \sum_{j_{tr}=1}^{n_{tr}} \phi(X_{tr,ij}) - \frac{1}{n_t} \sum_{j_t=1}^{n_t} \phi(X_{t,ij_s}) \right\|_H^2$$

$X_{tr,i}$ represents the transfer feature, $X_{t,i}$ represents the target feature, $\phi$ represents a kernel function, $X_{tr,ij}$ represents an individual data point of the transfer feature, and $X_{t,ij_s}$ represents an individual data point of the target feature.

A wear state online monitoring system based on transfer learning and multi-source information fusion according to the present disclosure includes the following modules:

A module M1 is configured to: separately collect data of a friction pair to be monitored in a friction and wear testing state and in an on-ship state, where the data includes in-situ images of the friction pair and multi-source tribological signals.

A module M2 is configured to: separately preprocess the collected in-situ images of the friction pair and multi-source tribological signals, and extract multi-source signal features and visual wear features based on preprocessed multi-source tribological signals and in-situ images of the friction pair.

A module M3 is configured to: use the multi-source signal features and the visual wear features extracted in the friction and wear testing state as source domain features, and use the multi-source signal features and the visual wear features extracted in the on-ship state as target domain features.

A module M4 is configured to: separately preprocess the source domain features and the target domain features to obtain preprocessed source domain features and target domain features.

A module M5 is configured to: perform feature transferring on the preprocessed source domain features and target domain features by using a feature transfer model, to obtain transfer features.

A module M6 is configured to: perform inverse normalization on the transfer features to obtain all data of the transfer features.

A module M7 is configured to: perform feature screening based on all the data of the transfer features, to obtain successfully transferred features.

A module M8 is configured to: train a random forest model by using the successfully transferred features to obtain a trained random forest model, and perform wear state monitoring by using the trained random forest model.

Specifically, the multi-source tribological signals may include a force/torque signal, an acoustic emission signal, and a vibration signal.

The force/torque signal may be derived from current data during an operation process of a power source or from data of a force/torque sensor installed on the friction pair or being capable of measuring the friction pair through a transmission mechanism.

The acoustic emission signal may include an acoustic pressure signal collected by an acoustic pressure sensor and an acoustic signal collected by a digital microphone.

The vibration signal may include a near-end signal collected by a vibration sensor fixedly installed near the friction pair and a far-end signal collected by a vibration sensor installed far away from the friction pair.

Specifically, the module M2 may include the following modules:

A module M2.1 is configured to perform signal filtering and signal cutting on the multi-source tribological signals, to obtain processed multi-source tribological signals.

A module M2.2 is configured to perform time domain analysis and frequency domain analysis on the processed multi-source tribological signals.

A module M2.3 is configured to perform image cropping, image graying, image noise reduction, and filtering on the in-situ images of the friction pair, to obtain processed in-situ images of the friction pair.

A module M2.4 is configured to extract edges of the friction pair by using a Canny algorithm based on the processed in-situ images of the friction pair.

A module M2.5 is configured to perform edge inpainting based on the extracted edges of the friction pair, to identify a wear region.

A module M2.6 is configured to separately perform, based on the identified wear region, feature extraction on a maximum wear width, an average wear width, and a wear area of a primary friction surface and a secondary friction surface of the friction pair.

Specifically, the module M2.2 may be configured to: perform time domain analysis and frequency domain analysis based on preprocessed force/torque signal, vibration signal, acoustic pressure signal, and acoustic signal, and extract a maximum value, a minimum value, a mean value, a median, a standard deviation, a root mean square, a skewness, kurtosis, a waveform factor, a peak factor, a pulse factor, and a margin factor.

$$x_{skew} = \frac{1}{N}\frac{\Sigma(x_i - \bar{x})^3}{x_{std}^3}$$

$$x_{kurt} = \frac{1}{N}\frac{\Sigma(x_i - \bar{x})^4}{x_{std}^4}$$

$$x_w = \frac{x_{rms}}{\frac{1}{N}\Sigma|x_i|}$$

$$x_{pe} = \frac{\max|x_i|}{x_{rms}}$$

$$x_{pu} = \frac{\max|x_i|}{\frac{1}{N}\Sigma|x_i|}$$

$$x_m = \frac{\max|x_i|}{\left(\frac{1}{N}\Sigma\sqrt{|x_i|}\right)^2}$$

$x_{skew}$ represents the skewness, N represents the number of $x_i$, $x_i$ represents an $i^{th}$ data point, $\bar{x}$ represents the mean value, $x_{std}$ represents the standard deviation, $x_{kurt}$ represents the kurtosis, $x_w$ represents the waveform factor, $x_{rms}$ represents the root mean square, $x_{pe}$ represents the peak factor, $x_{pu}$ represents the pulse factor, and $x_m$ represents the margin factor.

Preferably, the module M2.5 may be configured to: scan quasi-edges from left to right, and use quasi-edge pixels in a first column as confirmed edge points by default; in the scanning process, perform triangle search at a specific slope on quasi-edge points to the right of each current pixel, and search for a nearest quasi-edge point, connect the current pixel and the nearest quasi-edge point for edge inpainting, then use the nearest edge point as the current edge point, and repeat the search and repair process on quasi-edge points to the right of the nearest edge point; and discard an edge point located beyond a search region.

Specifically, the module M4 may include the following modules:

A module M4.1 is configured to: smooth each feature-time curve with a Savitzky-Golay filter to complete post-processing of the feature-time curve, set a polynomial degree to 1 to ensure local monotonicity of the feature-time curve, and set a window size to t data points to balance smoothing effect of the Savitzky-Golay filter and local trend retention of the feature-time curve; perform data augmentation on filtered data using an interpolation method; and perform preliminary feature selection using Pearson correlation analysis, to reduce a total number of the source domain features and the target domain features.

A module M4.2 is configured to: separately perform normalization on the source domain features and the target domain features to obtain 0-1 distribution of the source domain features and 0-1 distribution of the target domain features.

Specifically, the feature transfer model may adopt:

$$X_{tr,i} = f_{t,i}^{-1}\left(a_i^T f_{s,i}(X_{s,i}) + b_i\right)$$

$f_{t,i}$ represents a normalization function of the target domain features, $f_{s,i}$ represents a normalization function of the source domain features, $a_i$ and $b_i$ represent transfer parameters of the features, T represents transposition, $X_{s,i}$ represents the source domain feature, and $X_{tr,i}$ represents the target domain feature.

Specifically, the module M6 may be configured to: perform inverse normalization on the transfer features with the normalization function of the target domain features, to obtain all the data of the transfer features.

Specifically, the module M7 may be configured to: perform feature screening by using an MMD loss function based on all the data of the transfer features, to obtain the successfully transferred features.

The MMD loss function may adopt:

$$MMD(X_{tr,i}, X_{t,i}) = \left\|\frac{1}{n_{tr}}\sum_{j_{tr}=1}^{n_{tr}}\phi(X_{tr,ij}) - \frac{1}{n_t}\sum_{j_t=1}^{n_t}\phi\left(X_{t,ij_s}\right)\right\|_H^2$$

$X_{tr,i}$ represents the transfer feature, $X_{t,i}$ represents the target feature, $\phi$ represents a kernel function, $X_{tr,i}$ j represents an individual data point of the transfer feature, and $X_{t,ij_s}$ represents an individual data point of the target feature.

Embodiment 2

The embodiment 2 is the preferred embodiment of Embodiment 1.

As shown in FIG. 1, the wear state online monitoring method based on transfer learning and multi-source information fusion according to the present disclosure includes the following steps:

In step S1, data collection is performed on a friction pair to be monitored, including building a test system, installing a collection device, carrying out design of experiments (DOE) to collect data, collecting in-situ images of the friction pair and multi-source tribological signals including a force/torque signal, an acoustic emission signal, and a vibration signal.

In step S2, feature extraction is performed on the data of the friction pair to be monitored, including extracting multi-source signal features and performing signal preprocessing for time domain and frequency domain analysis, extracting visual wear features and performing image preprocessing to extract edges of the friction pair and identify a wear region.

In step S3, wear state monitoring on the friction pair to be monitored is implemented.

Specifically, in Step S1, the experiment designed through DOE includes data generated during the history operation of the friction pair and data of the friction pair generated during the newly designed test condition, and the above data needs to be calibrated according to the wear form determined by the off-line detection and analysis on the friction pair.

In the step S1, the collected multi-source tribological signals include a force/torque signal, an acoustic emission signal, and a vibration signal. The force/torque signal is derived from current data during an operation process of a power source or from data of a force/torque sensor installed on the friction pair or being capable of measuring the friction pair through a transmission mechanism. The acoustic emission signal includes an acoustic pressure signal collected by an acoustic pressure sensor and an acoustic signal collected by a digital microphone. The vibration signal includes a near-end signal collected by a vibration sensor fixedly installed near the friction pair and a far-end signal collected by a vibration sensor installed far away from the friction pair.

Figure 2:
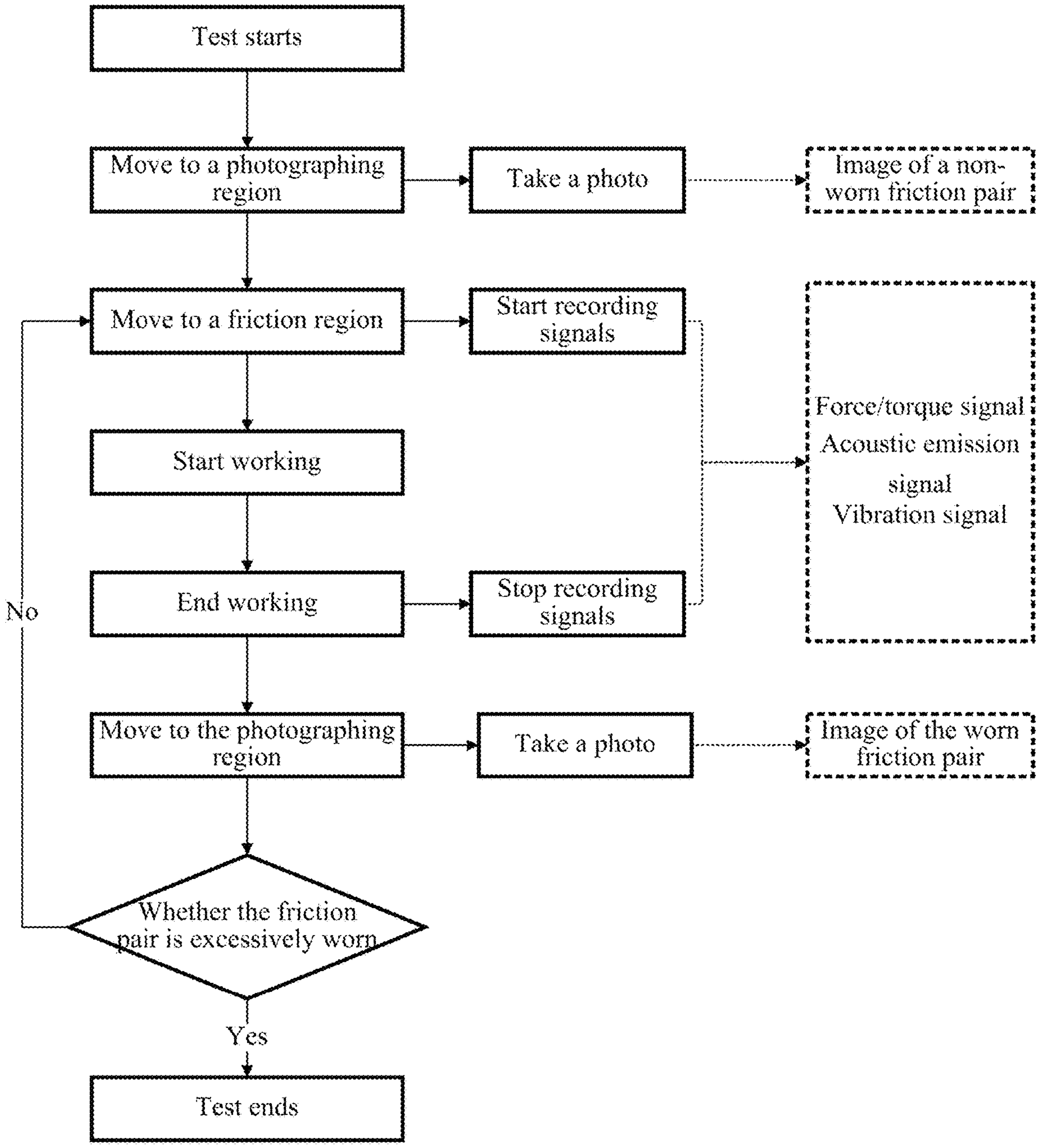
FIG. 2 is a data collection flowchart of a wear state online monitoring method.

Specifically, as shown in FIG. 2, data collection includes the following steps: moving the friction pair to a photographing region to take photos and obtain an image of the non-worn friction pair; moving the friction pair to a friction region to start recording signals including the force/torque signal, the acoustic emission signal, and the vibration signal, until the end of work; moving the friction pair to the photographing region to take photos and obtain an image of the worn friction pair; determining whether the friction pair has been excessively worn; if not, moving the friction pair to the friction region again and repeating the operations; and ending the test until the friction pair has been excessively worn.

Figure 3:
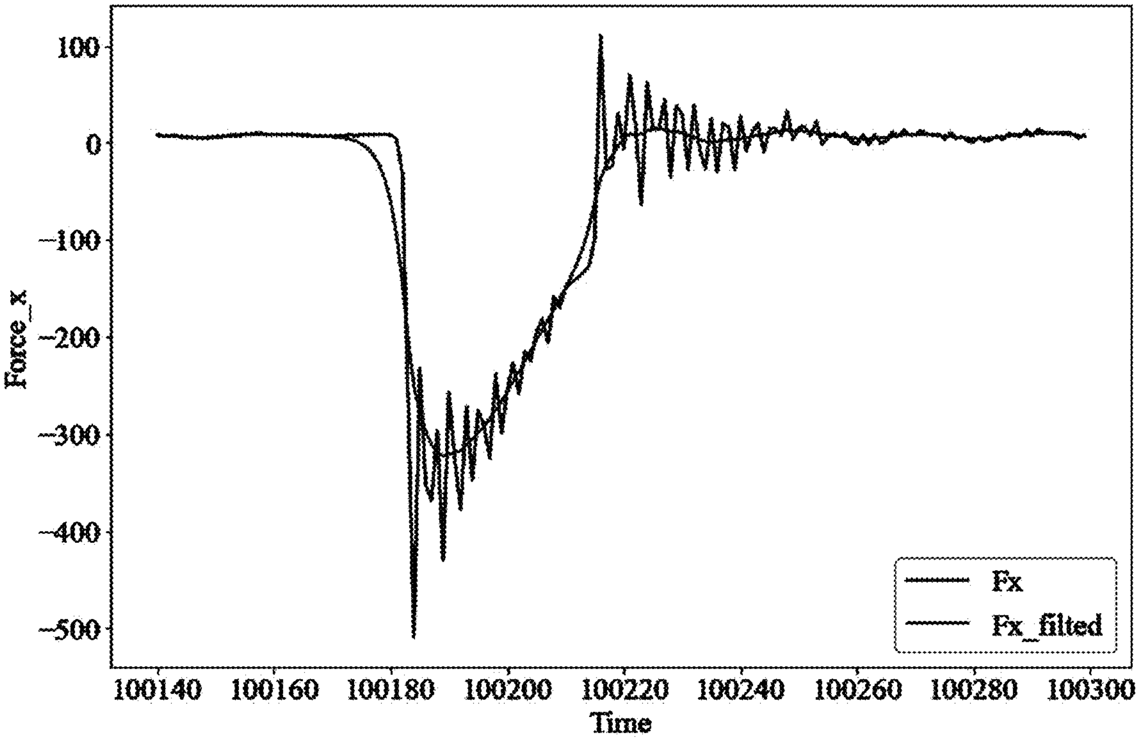
FIG. 3 is a schematic diagram of signal filtering.

Specifically, in the step S2, extraction of the multi-source signal features requires signal preprocessing, including:

Signal filtering: As shown in FIG. 3, a filtering mode and a filtering threshold are determined by observing the signal spectrum change with the increase in working cycles of the friction pair after the Fourier transform. Based on the sub-wave distribution following Fourier decomposition, signals are categorized into two types: force/torque signals and vibration and acoustic emission signals. The force/torque signals feature primary sub-waves distributed in the frequency band of less than 250 Hz. As the wear amount increases, the amplitude of the low-frequency sub-wave gradually increases, with a larger increase in amplitude observed at a larger wear amount. These signals are processed through low-pass filtering, with the filtering threshold set at 250 Hz. Furthermore, the force/torque signal during a single working cycle of the friction pair is divided into a front-haul phase and a back-haul phase. The signal waveform during the front-haul phase is preserved while high-frequency noise and signal fluctuations during the back-haul phase are filtered out. The vibration and acoustic emission signals feature primary sub-waves distributed in higher frequency bands, with the amplitude of the sub-waves decreasing gradually as the wear amount increases. Additionally, there exists a stable low-frequency wave induced by the environment, which remains unaffected by the wear state and requires filtering. These signals are processed through bandpass filtering, with the threshold set at 700 Hz and 1800 Hz.

Figure 4:
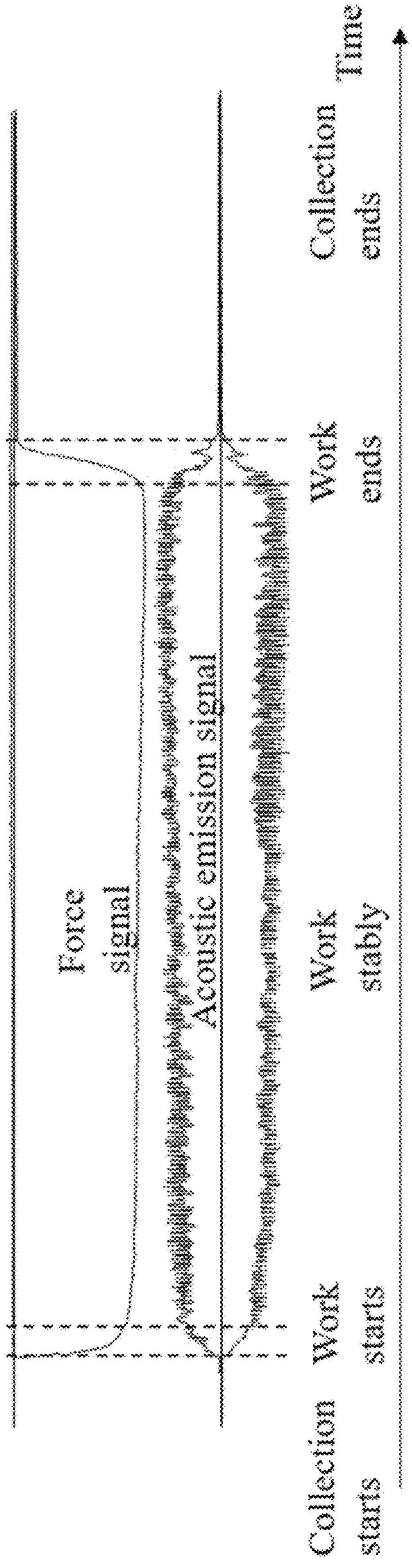
FIG. 4 is a schematic diagram of signal cutting.
Figure 5A:
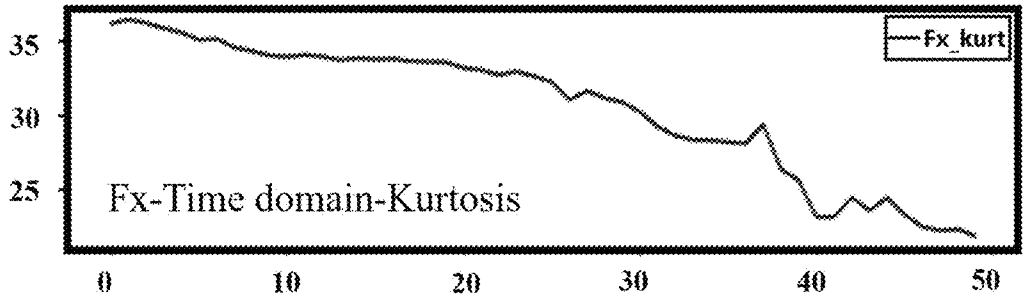
FIGS. 5A-5F are schematic diagrams of feature extraction.
Figure 5B:
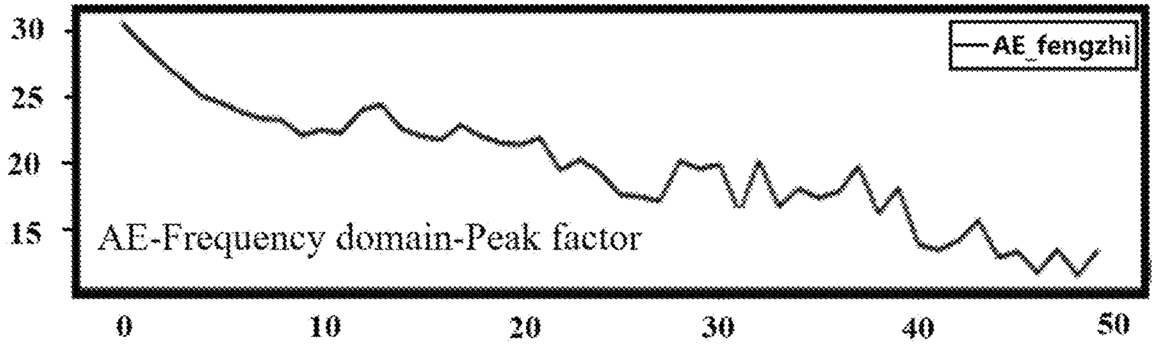
Figure 5C:
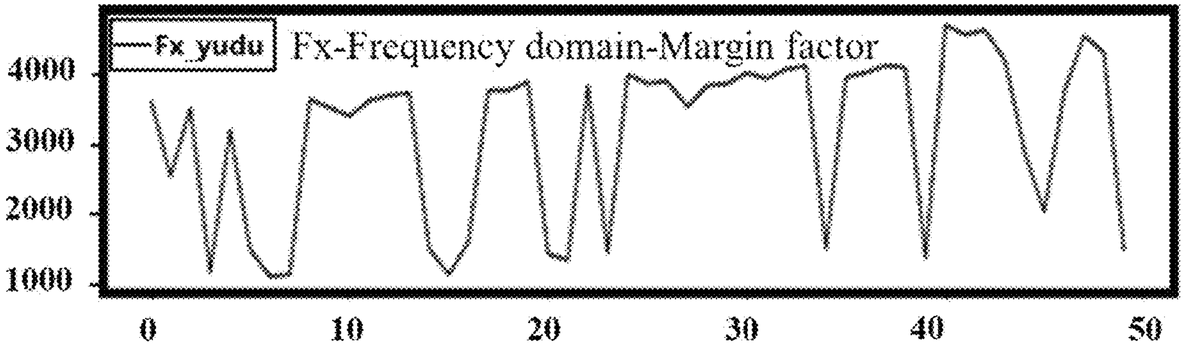
Figure 5D:
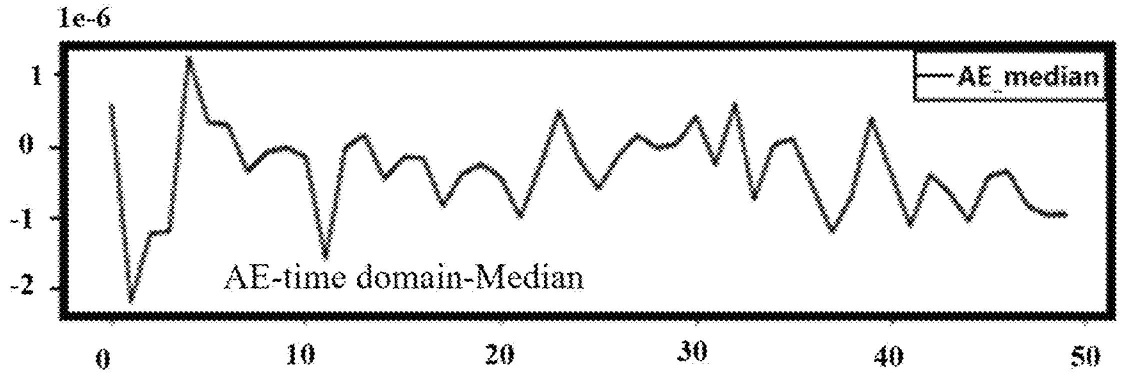
Figure 5E:
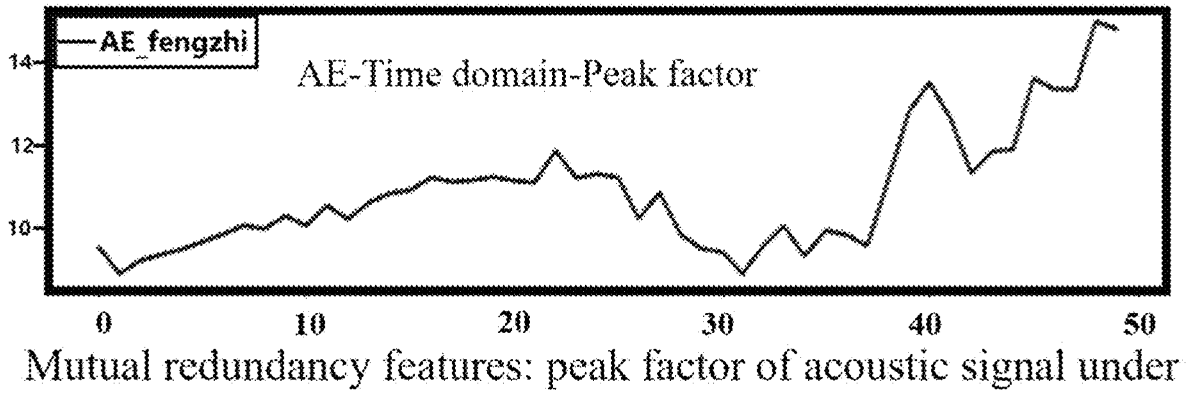
Figure 5F:
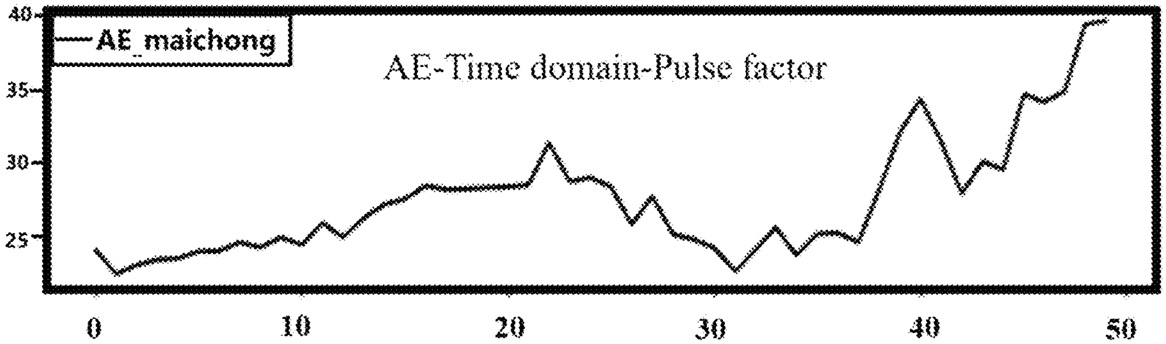

Signal cutting: As shown in FIG. 4, time axes are aligned at the moment when the amplitude of each multi-source signal increases for the first time, to mitigate the influence on signal consistency caused by different signal collection software and the time difference between the start time of collection. When the signal is uncutted, it fluctuates within a narrow range near the zero point. A threshold value higher than the fluctuation range is set. By scanning the entire signal from left to right, a time point at which the signal amplitude exceeds the threshold value for the first time is identified as the starting time point for cutting. This time point is also utilized to align the time axes across multi-source signals. At this time point, a backward translation for a designated duration is applied to bypass the rapid signal growth phase at the beginning of cutting, serving as the starting time point for cutting. The cut signal time length $l_{cutted\ signal}$ is fixed and is obtained by rounding up based on the feed direction length $l_{feed}$, the sampling frequency f, and the feed speed v of the friction pair. The corresponding length d of the start phase and the end phase is obtained according to the motion of the friction pair in the experiment. The fixed signal length after cutting is calculated as follows:

$$l_{cutted\ signal} = \frac{l_{feed} - d}{v} \times f$$

Feature extraction: As shown in FIGS. 5A-5F, nine types of multi-source signals obtained from the experiments include the force signals ($F_x$, $F_y$, and $F_z$), the torque signals ($M_x$, $M_y$, and $M_z$), the vibration signal ($V_x$), the acoustic pressure signal ($A_p$), and the acoustic signal ($A_s$). Time domain analysis and frequency domain analysis are performed on each signal to extract a total of 12 statistical features including the maximum value, the minimum value, the mean value, the median value, the standard deviation, the root mean square, the skewness, the kurtosis, the waveform factor, the peak factor, the pulse factor, and the margin factor, resulting in 216 signal features.

$$\text{Skewness: } x_{skew} = \frac{1}{N}\frac{\Sigma(x_i - \overline{x})^3}{x_{std}^3}$$

$$\text{Kurtosis: } x_{kurt} = \frac{1}{N}\frac{\Sigma(x_i - \overline{x})^4}{x_{std}^4}$$

$$\text{Waveform factor: } x_w = \frac{x_{rms}}{\frac{1}{N}\Sigma|x_i|}$$

$$\text{Peak factor: } x_{pe} = \frac{\max|x_i|}{x_{rms}}$$

$$\text{Pulse factor: } x_{pu} = \frac{\max|x_i|}{\frac{1}{N}\Sigma|x_i|}$$

$$\text{Margin factor: } x_m = \frac{\max|x_i|}{\left(\frac{1}{N}\Sigma\sqrt{|x_i|}\right)^2}$$

In the step S2, extraction of the visual wear features requires image preprocessing, including:

Image cropping: The original photo of the friction pair is cropped based on the main wear position of the friction pair, with the wear upper edge of the friction pair as the upper boundary of the cropped image and the left vertex as the left boundary of the cropped image.

Image graying: Three graying methods, namely, the three-channel averaging method, the three-channel weighting method, and the single-channel graying method, are compared, and single-channel G graying processing is selected based on the regional boundary clarity of the collected image after graying processing.

Image denoising and filtering: Median filtering is used to deal with salt and pepper noises to keep the edge clarity. A 5×5 window is selected for median filtering to balance the influence of the window size on the smoothing effect and wear region clarity.

In Step S2, extraction of the visual wear features requires edge extraction, including:

Upper and lower edge extraction: Edges are extracted based on the Canny algorithm, and the extracted edges are scanned from top to bottom column by column. An edge pixel at the highest position is found for each column of pixels, and the first row of pixels is selected for the side of the friction pair to obtain the quasi-upper edge. Similarly, the lowest edge pixels are extracted as the quasi-lower edge.

Figure 6:
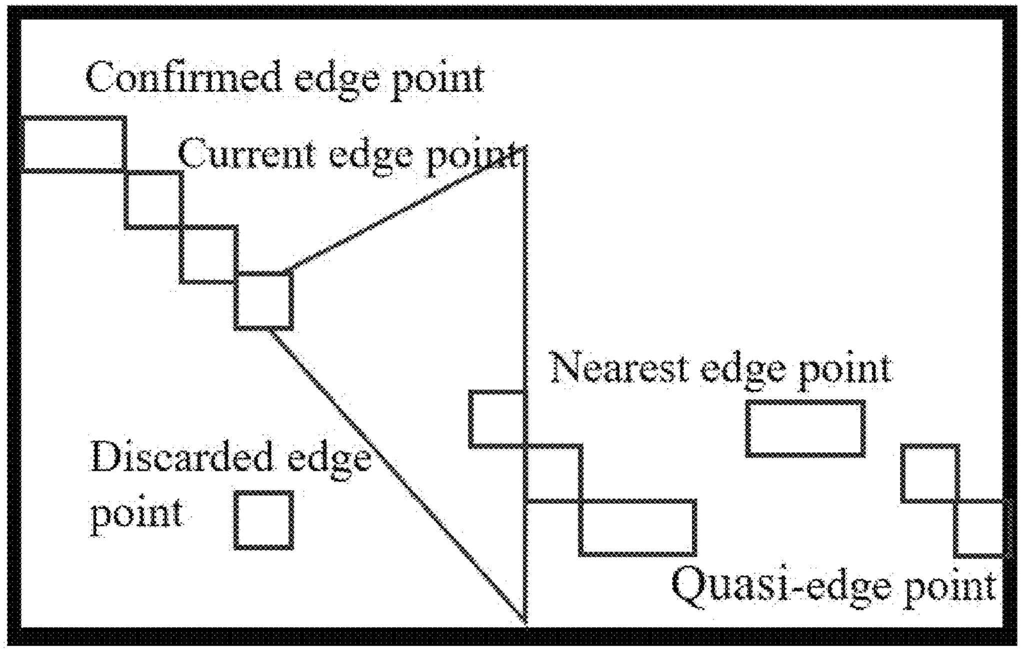
FIG. 6 is a schematic diagram of an edge inpainting algorithm.

Edge inpainting: As shown in FIG. 6, the quasi-edges are scanned from left to right, and the quasi-edge pixels in a first column are used as confirmed edge points by default. In the scanning process, triangle search at a specific slope is performed on quasi-edge points to the right of each current pixel, and the nearest quasi-edge point is found, the current pixel and the nearest quasi-edge point are connected for edge inpainting, then the nearest edge point is used as the current edge point, and the search and repair process is repeated on quasi-edge points to the right of the nearest edge point. In addition, edge points located beyond the search region are discarded. Considering the shape of the friction pair and the distribution of edge points, for upper edge inpainting, the upper slope of the triangular search region is 1 and the lower slope is 1.5; for lower edge inpainting, the upper slope of the triangle search region is 1 and the lower slope is 2.

Figure 7:
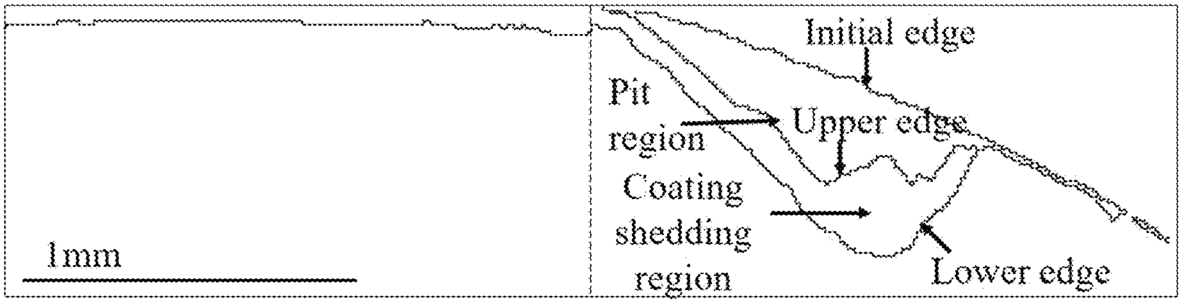
FIG. 7 is a schematic diagram of a wear region identification result.

In the step S2, extraction of the visual wear features requires region identification, including:

Wear region identification: As shown in FIG. 7, the upper edge extracted from the image of the unworn friction pair is used as the initial edge. For the image of the worn friction pair, the region between the initial edge and the upper edge is the pit region, and the wear forms in the region are pits and defects. The region between the upper edge and the lower edge is the coating shedding region, and the wear form in the region is the surface coating shedding, but there is still main material not shed.

In the step S2, extraction of the visual wear features requires wear feature extraction, including:

Wear feature extraction: Feature extraction is separately performed, based on the identified wear region, on a maximum wear width, an average wear width, and a wear area of a primary friction surface and a secondary friction surface of the friction pair. The wear amounts of the two different wear forms, namely, pits and coating shedding, are added after weighting. The weighting coefficient of the wear form of pits is set to 1. The weighting coefficient of the wear form of coating shedding is set to 0.8.

Figure 8:
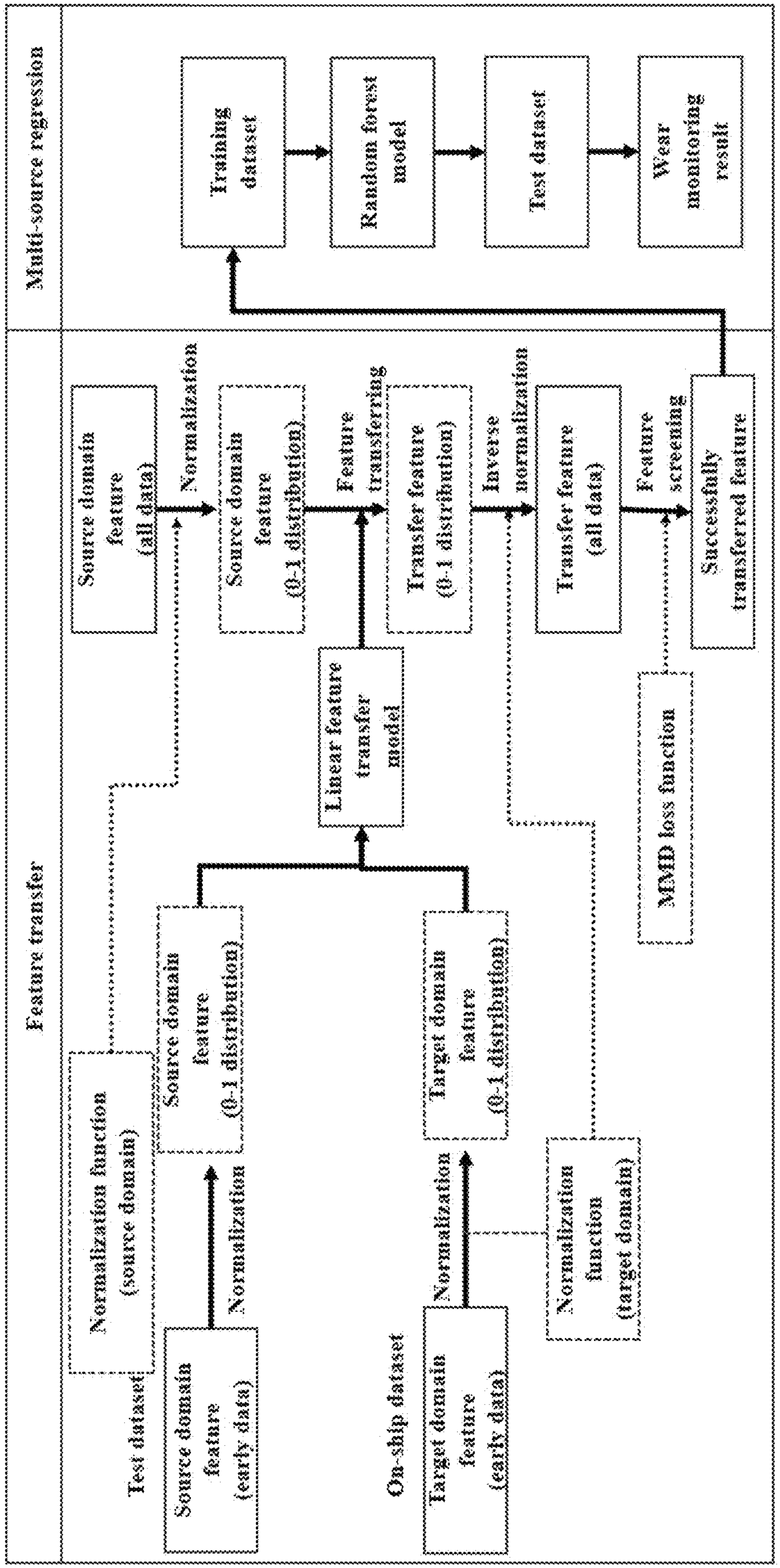
FIG. 8 is a flowchart of wear prediction.

In the step S3, as shown in FIG. 8, the wear state online monitoring includes:

Dataset preparation: Each feature-time curve is smoothed with a Savitzky-Golay filter to complete post-processing of the feature-time curve, a polynomial degree is set to 1 to ensure local monotonicity of the feature-time curve, and a window size is set to seven data points to balance the smoothing effect of the Savitzky-Golay filter and local trend retention of the feature-time curve. In order to enrich the sample data, data augmentation is performed on filtered data using an interpolation method, to expand original 50 groups of feature data in each experiment to approximately 300 groups of feature data, thereby improving model accuracy. Preliminary feature selection is performed using Pearson correlation analysis. The threshold of feature screening is set to 0.6, that is, the features having a correlation coefficient less than 0.6 with the wear amount are eliminated, to reduce a total number of the source domain features and the target domain features.

Feature transfer: 150 groups of data in the early wear phase are used to establish a feature transfer model, and min-max normalization is separately performed on the source domain features and the target domain features, such that each feature is distributed between 0 and 1. After the transformation, a one-to-one linear transfer model is constructed for each pair of corresponding source domain feature and target domain feature. The linear transfer model of the feature $X_i$ adopts the following formula:

$$X_{tr,i} = f_{t,i}^{-1}\left(a_i^T f_{s,i}(X_{s,i}) + b_i\right)$$

$f_{t,i}$ represents a normalization function of the target domain features, $f_{s,i}$ represents a normalization function of the source domain features, $a_i$ and $b_i$ represent transfer parameters of the features, T represents transposition, $X_{s,i}$ represents the source domain feature, and $X_{tr,i}$ represents the target domain feature.

The root mean square discrepancy between the transferred feature and the target feature is used as the loss function, and the stochastic gradient descent method is used to optimize and obtain the optimal transfer parameters.

The feature transfer model obtained from early data is applied to all the normalized data of source domain features to obtain the transfer features distributed between 0 and 1, and the final transfer features are obtained by applying the target domain denormalization function. The early wear data, that is, the first 150 groups of data of transfer features and target features are used to calculate the MMD between the corresponding features. The transfer features with MMD less than 0.5 are selected as the successfully transferred features, and only the successfully transferred features are retained after the second selection. The MMD is calculated using the following formula. $X_{tr,i}$ represents the transfer feature, $X_{t,i}$ represents the target feature, $\phi$ represents the kernel function, and the kernel function is the Gaussian kernel function.

$$MMD(X_{tr,i}, X_{t,i}) = \left\| \frac{1}{n_{tr}} \sum_{j_{tr}=1}^{n_{tr}} \phi(X_{tr,ij}) - \frac{1}{n_t} \sum_{j_t=1}^{n_t} \phi\left(X_{t,ij_s}\right) \right\|_H^2$$

A wear state online monitoring device based on transfer learning and multi-source information fusion according to the present disclosure includes a multi-source signal collection module, a visual collection module, a signal processing module, a signal transmission module, and a state display terminal.

The multi-source signal collection module is configured to collect multi-source tribological signals such as a force/torque signal, an acoustic emission signal, and a vibration signal generated in the working process of a friction pair, and the module includes a force/torque sensor, a power source performance sensor (such as a current sensor of a motor), an acoustic pressure sensor, a digital microphone, a vibration sensor installed near the friction pair, and a vibration sensor installed far away from the friction pair.

The visual collection module is configured to photograph, in a specified working period, the surface state of the friction pair in a same frame at a unified visual angle, and the module includes an industrial camera and a positioning device for keeping the friction pair in the same photograph position.

The signal processing module is configured to perform signal filtering, signal cutting, feature extraction, image cropping, image graying, image noise reduction and filtering, upper and lower edge extraction, edge inpainting, wear region identification, and wear feature extraction in the step S2 of feature extraction, as well as dataset preparation, wear prediction in a single working condition scene, and feature transfer in a multi-working condition scene in the step S3 of wear prediction in the wear state online monitoring method based on transfer learning and multi-source information fusion. The module includes a single chip microcomputer and necessary signal receiving and transmitting conversion ports.

The signal transmission module is configured to send to the signal processing module the data collected by the multi-source signal collection module and the data collected by the visual collection module, and send to the state display terminal the wear state monitoring result of the signal processing module. The module includes a ZigBee wireless transmission module and an EtherCAT transmission module.

The state display terminal is configured to display the wear state and includes a portable terminal and a display terminal at the headquarters data center.

Those skilled in the art are aware that in addition to being realized by using pure computer-readable program code, the system, the apparatus, and each module thereof provided in the present disclosure can realize the same program in a form of a logic gate, a switch, an application-specific integrated circuit, a programmable logic controller, or an embedded microcontroller by performing logic programming on the method steps. Therefore, the system, the apparatus, and each module thereof provided in the present disclosure can be regarded as a kind of hardware component. The module included therein for realizing each program can also be regarded as a structure in the hardware component; and the module for realizing each function can also be regarded as a software program for implementing the method or a structure in the hardware component.

The specific examples of the present disclosure are described above. It should be understood that the present disclosure is not limited to the above specific implementations, and a person skilled in the art can make various variations or modifications within the scope of the claims without affecting the essence of the present disclosure. The examples of the present disclosure and features in the examples may be arbitrarily combined with each other in a non-conflicting situation.

What is claimed is:

1. A wear state online monitoring method based on transfer learning and multi-source information fusion, comprising:

step S1: separately collecting data of a friction pair to be monitored in a friction and wear testing state and in an on-ship state, wherein the data comprises in-situ images of the friction pair and multi-source tribological signals;

step S2: separately preprocessing the collected in-situ images of the friction pair and multi-source tribological signals, and extracting multi-source signal features and visual wear features based on preprocessed multi-source tribological signals and in-situ images of the friction pair;

step S3: using the multi-source signal features and the visual wear features extracted in the friction and wear testing state as source domain features, and using the multi-source signal features and the visual wear features extracted in the on-ship state as target domain features;

step S4: separately preprocessing the source domain features and the target domain features to obtain preprocessed source domain features and target domain features;

step S5: performing feature transferring on the preprocessed source domain features and target domain features by using a feature transfer model, to obtain transfer features;

step S6: performing inverse normalization on the transfer features to obtain all data of the transfer features;

step S7: performing feature screening based on all the data of the transfer features, to obtain successfully transferred features; and step S8: training a random forest model by using the successfully transferred features to obtain a trained random forest model, and performing wear state monitoring by using the trained random forest model, wherein the multi-source tribological signals comprise a force/torque signal, an acoustic emission signal, and a vibration signal; the force/torque signal is derived from current data during an operation process of a power source or from data of a force/torque sensor installed on the friction pair or being capable of measuring the friction pair through a transmission mechanism; the acoustic emission signal comprises an acoustic pressure signal collected by an acoustic pressure sensor and an acoustic signal collected by a digital microphone; and the vibration signal comprises a near-end signal collected by a vibration sensor fixedly installed near the friction pair and a far-end signal collected by a vibration sensor installed far away from the friction pair.

2. The wear state online monitoring method based on transfer learning and multi-source information fusion according to claim 1, wherein the step S2 comprises:

step S2.1: performing signal filtering and signal cutting on the multi-source tribological signals, to obtain processed multi-source tribological signals;

step S2.2: performing time domain analysis and frequency domain analysis on the processed multi-source tribological signals;

step S2.3: performing image cropping, image graying, image and filtering on the in-situ the noise reduction, images of friction pair, to obtain processed in-situ images of the friction pair;

step S2.4: extracting edges of the friction pair by using a Canny algorithm based on the processed in-situ images of the friction pair;

step S2.5: performing edge inpainting based on the extracted edges of the friction pair, to identify a wear region; and step S2.6: based on the identified wear region, separately performing feature extraction on a maximum wear width, an average wear width, and a wear area of a primary friction surface and a secondary friction surface of the friction pair.

3. The wear state online monitoring method based on transfer learning and multi-source information fusion according to claim 2, wherein the step S2.2 comprises: performing time domain analysis and frequency domain analysis based on preprocessed force/torque signal, vibration signal, acoustic pressure signal, and acoustic signal, and extracting a maximum value, a minimum value, a mean value, a median, a standard deviation, a root mean square, a skewness, kurtosis, a waveform factor, a peak factor, a pulse factor, and a margin factor:

$$x_{skew} = \frac{1}{N}\frac{\Sigma(x_i - \overline{x})^3}{x_{std}^3}$$

$$x_{kurt} = \frac{1}{N}\frac{\Sigma(x_i - \overline{x})^4}{x_{std}^4}$$

$$x_w = \frac{x_{rms}}{\frac{1}{N}\Sigma|x_i|}$$

$$x_{pe} = \frac{\max|x_i|}{x_{rms}}$$

$$x_{pu} = \frac{\max|x_i|}{\frac{1}{N}\Sigma|x_i|}$$

$$x_m = \frac{\max|x_i|}{\left(\frac{1}{N}\Sigma\sqrt{|x_i|}\right)^2}$$

wherein $x_{skew}$ represents the skewness, N represents the number of $x_i$, $x_i$ represents an ith data point, $\overline{x}$ represents the mean value, $x_{std}$ represents the standard deviation, $x_{kurt}$ represents the kurtosis, $x_w$ represents the waveform factor, $x_{rms}$ represents the root mean square, $x_{pe}$ represents the peak factor, $x_{pu}$ represents the pulse factor, and $x_m$ represents the margin factor.

4. The wear state online monitoring method based on transfer learning and multi-source information fusion according to claim 2, wherein the step S2.5 comprises: scanning quasi-edges from left to right, using quasi-edge pixels in a first column as confirmed edge points by default; in the scanning process, performing triangle search at a specific slope on quasi-edge points to the right of each current pixel, and searching for a nearest quasi-edge point, connecting the current pixel and the nearest quasi-edge point for edge inpainting, then using the nearest edge point as the current edge point, and repeating the search and inpainting process on quasi-edge points to the right of the nearest edge point; and discarding an edge point located beyond a search region.

5. The wear state online monitoring method based on transfer learning and multi-source information fusion according to claim 1, wherein the step S4 comprises:

step S4.1: smoothing each feature-time curve with a Savitzky-Golay filter to complete post-processing of the feature-time curve, setting a polynomial degree to 1 to ensure local monotonicity of the feature-time curve, and setting a window size to t data points to balance smoothing effect of the Savitzky-Golay filter and local trend retention of the feature-time curve; performing data augmentation on filtered data using an interpolation method; and performing preliminary feature selection using Pearson correlation analysis, to reduce a total number of the source domain features and the target domain features; and step S4.2: separately performing normalization on the source domain features and the target domain features to obtain 0-1 distribution of the source domain features and 0-1 distribution of the target domain features.

6. The wear state online monitoring method based on transfer learning and multi-source information fusion according to claim 1, wherein the feature transfer model is expressed as follows:

$$X_{tr,i} = f_{t,i}^{-1}\left(a_i^T f_{s,i}(X_{s,i}) + b_i\right)$$

wherein $f_{t,i}$ represents a normalization function of the target domain features, $f_{s,i}$ represents a normalization function of the source domain features, $a_i$ and $b_i$ represent transfer parameters of the features, T represents transposition, $X_{s,i}$ represents the source domain features, and $X_{tr,i}$ represents the target domain features.

7. The wear state online monitoring method based on transfer learning and multi-source information fusion according to claim 1, wherein the step S6 comprises: performing inverse normalization on the transfer features with the normalization function of the target domain features, to obtain all the data of the transfer features.

8. The wear state online monitoring method based on transfer learning and multi-source information fusion according to claim 5, wherein the step S7 comprises: performing feature screening by using a maximum mean discrepancy (MMD) loss function based on all the data of the transfer features, to obtain the successfully transferred features; and the MMD loss function is expressed as follows:

$$MMD(X_{tr,i}, X_{t,i}) = \left\| \frac{1}{n_{tr}} \sum_{j_{tr}=1}^{n_{tr}} \phi(X_{tr,ij}) - \frac{1}{n_t} \sum_{j_t=1}^{n_t} \phi\left(X_{t,ij_s}\right) \right\|_H^2$$

wherein $X_{tr,i}$ represents the transfer feature, $X_{t,i}$ represents the target feature, $\phi$ represents a kernel function, $X_{tr,ij}$ represents an individual data point of the transfer feature, and $X_{t,ij_s}$ represents an individual data point of the target feature.

9. A wear state online monitoring system based on transfer learning and multi-source information fusion, comprising:

a module M1 configured to: separately collect data of a friction pair to be monitored in a friction and wear testing state and in an on-ship state, wherein the data comprises in-situ images of the friction pair and multi-source tribological signals;

a module M2 configured to: separately preprocess the collected in-situ images of the friction pair and multi-source tribological signals, and extract multi-source signal features and visual wear features based on preprocessed multi-source tribological signals and in-situ images of the friction pair;

a module M3 configured to: use the multi-source signal features and the visual wear features extracted in the friction and wear testing state as source domain features, and use the multi-source signal features and the visual wear features extracted in the on-ship state as target domain features;

a module M4 configured to: separately preprocess the source domain features and the target domain features to obtain preprocessed source domain features and target domain features;

a module M5 configured to: perform feature transferring on the preprocessed source domain features and target domain features by using a feature transfer model, to obtain transfer features;

a module M6 configured to: perform inverse normalization on the transfer features to obtain all data of the transfer features;

a module M7 configured to: perform feature screening based on all the data of the transfer features, to obtain successfully transferred features; and a module M8 configured to: train a random forest model by using the successfully transferred features to obtain a trained random forest model, and perform wear state monitoring by using the trained random forest model, wherein the multi-source tribological signals comprise a force/torque signal, an acoustic emission signal, and a vibration signal; the force/torque signal is derived from current data during an operation process of a power source or from data of a force/torque sensor installed on the friction pair or being capable of measuring the friction pair through a transmission mechanism; the acoustic emission signal comprises an acoustic pressure signal collected by an acoustic pressure sensor and an acoustic signal collected by a digital microphone; and the vibration signal comprises a near-end signal collected by a vibration sensor fixedly installed near the friction pair and a far-end signal collected by a vibration sensor installed far away from the friction pair.

* * * * *